April 12, 1932.  J. C. WOODFORD  1,854,010
AIR CLEANER
Original Filed May 31, 1927   2 Sheets-Sheet 2
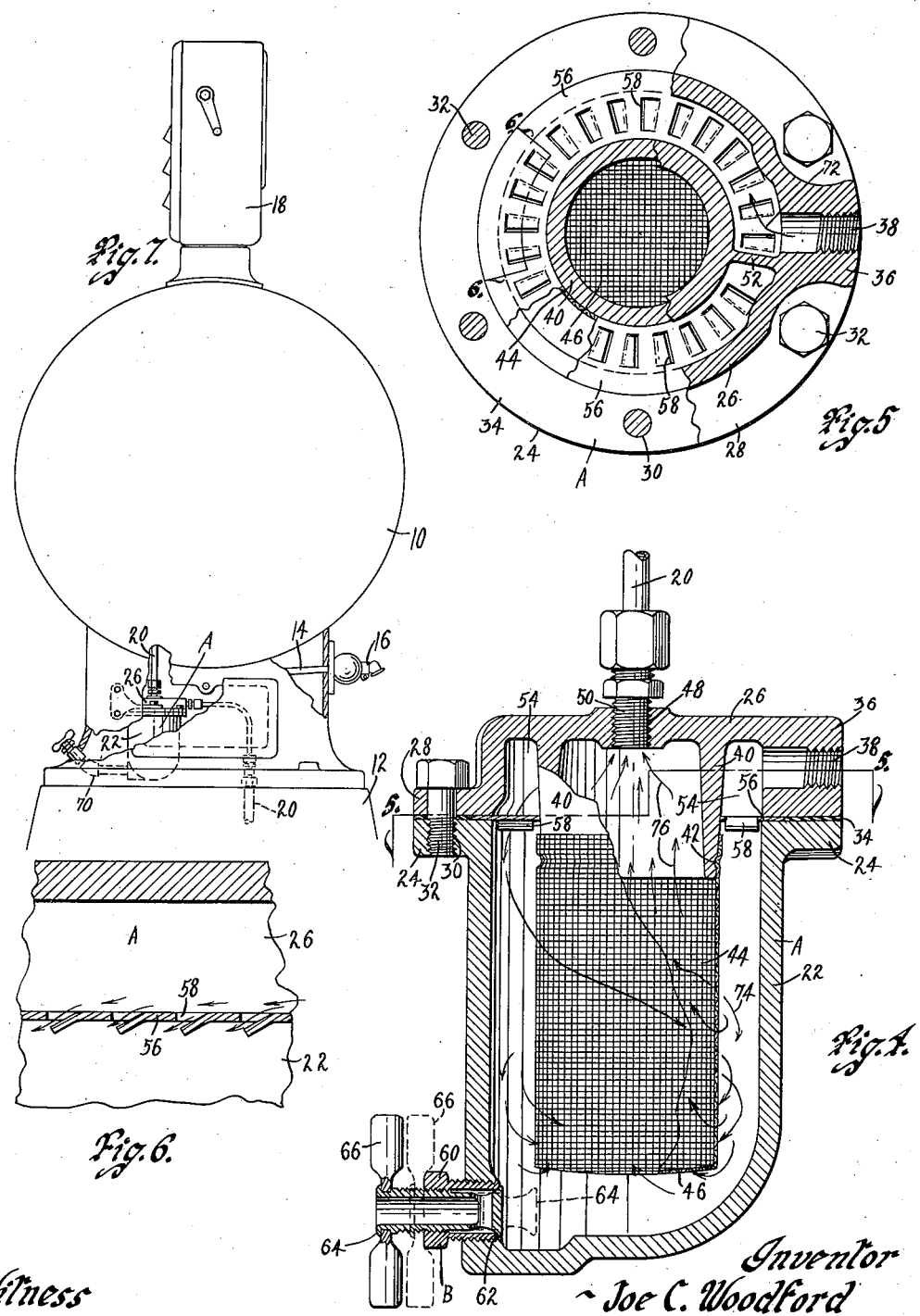
Witness
L. F. Sandberg
Inventor
Joe C. Woodford
By Bair & Freeman Attorneys Patented Apr. 12, 1932

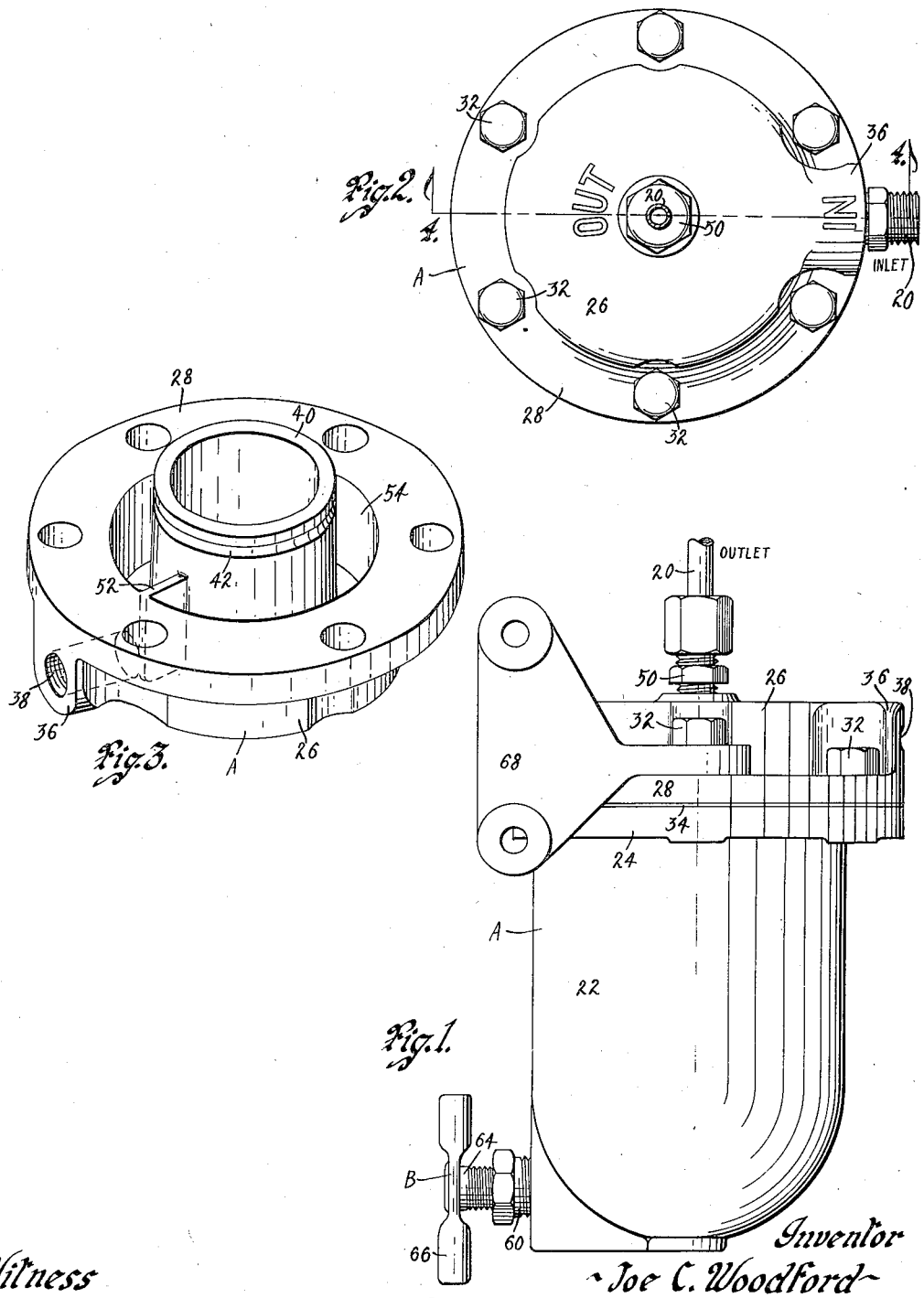

1,854,010

UNITED STATES PATENT OFFICE

JOE C. WOODFORD, OF ARDMORE, PENNSYLVANIA, ASSIGNOR TO SERVICE STATION EQUIPMENT COMPANY, OF BRYAN, OHIO, A CORPORATION OF DELAWARE

AIR CLEANER

Application filed May 31, 1927, Serial No. 195,234. Renewed July 6, 1931.

The object of my invention is to provide an air cleaner and sediment trap for air service stations particularly of the kind for use in inflating automobile tires.

It may be here mentioned that it is very desirable that the compressed air entering an automobile tire be as clean as possible thus adding to the life of the tire and at the same time insuring proper operation of automatic inflator units now used for measuring the air passing from a source of supply to the tire and it is my object to provide an air cleaner and sediment trap interposed in the supply line or pipe wherein the air passing into the cleaner is given a centrifugal action causing impurities contained in the air to be thrown outwardly and downwardly thus allowing only clean air to pass through the remaining portion of the supply line and into the tire to be inflated.

Still another object is to provide an air cleaner wherein the air is first given a whirling effect and then permitted to pass through a very fine mesh screen of large area thus preventing the screen from becoming clogged or ineffective with the result that the air passing into the tire is in clean condition.

Still another object is to provide a valve controlled outlet for the cleaner so that at regular intervals the cleaner itself may be cleaned or "blown-out" at tank pressure thus cleaning the entire supply line from the tank to the cleaner itself as well as the cleaner. The cleaner gathers any moisture which may accumulate in the compressed air due to weather conditions and retains it within the cleaner until blown-out.

Still another object is to provide a plate having louver openings therein in the line of travel of the compressed air when it enters the cleaner proper for giving the flow of air an effective centrifugal course.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side view of my improved air cleaner and sediment trap.

Figure 2 is a top plan view of the same.

Figure 3 is a perspective view of the cover plate of the cleaner.

Figure 4 is a central vertical sectional view taken on the line 4—4 of Figure 2 with the blow-out valve shown in closed position.

Figure 5 is a sectional view taken on the line 5—5 of Figure 4, parts being broken away to better illustrate the construction thereof.

Figure 6 is a detail sectional view taken on the line 6—6 of Figure 5 illustrating the louver openings and Figure 7 exemplifies the installation of the air cleaner and sediment trap in an air service station.

In the embodiment of my invention as disclosed in the accompanying drawings, I have used the reference numeral 10 to indicate generally an air station of the reel type. The air station 10 may be mounted upon a base 12 and includes an air hose 14 having a chuck 16 thereon.

The hose 14 may be withdrawn from the station 10 and positioned for use in inflating automobile tires. The supply of air passing through the hose 14 is ordinarily controlled by an automatic inflator unit and in the drawings, I have shown a casing 18 placed upon the air station 10 in which is mounted an inflator unit for measuring the amount of air permitted to enter the tire.

Automatic inflator units are now on the market and form no part of my present invention except that it is very desirable to have an air cleaner and sediment trap positioned in the supply line before the air passes into the inflator unit thus eliminating any foreign matter from interfering with effective operation of the inflator unit.

Air is fed through an air supply pipe 20, through an inflator unit and thence to the hose 14. In the air supply pipe 20 I couple an air cleaner and sediment trap A. The compressed air from a tank is permitted to pass through the supply pipe 20 into the air cleaner and sediment trap A and thence into the remaining portion of the supply pipe.

My air cleaner comprises a cup-shaped casting or member 22 having an outturned flange 24 formed upon its upper edge. A removable cover member 26 is positioned over the upper end of the cup-shaped member 22 and is also provided with an outturned flange 28 of substantially the same size and shape as the flange 24.

The flange 24 is provided with screw threaded openings 30 for receiving machine screws 32 which extend through openings in the flange 28. The cover 26 is thus securely held upon the member 22. The two parts 22 and 26 just described form the casing of my air strainer. Placed between the adjacent surfaces of the flanges 24 and 28 is a gasket 34 of any suitable material for forming an air tight connection between the cover 26 and the member 22.

Upon one side of the cover 26 and formed integral therewith is a fitting 36 having a screw threaded opening 38 therein. The screw threaded opening 38 is in communication with the interior of the air cleaner when the parts are assembled as is clearly illustrated in Figure 4 of the drawings. The screw threaded opening 38 receives one end of the pipe 20 and serves as the inlet opening for the cleaner.

Formed upon the underside of the cover member 26 and centrally located relative to the side walls thereof is a downwardly extending sleeve 40. The sleeve 40 is of greater length than the length of the walls of the cover 26 and therefore projects into the cup-shaped member 22.

The sleeve 40 is provided with an annular groove 42 in its outer face adjacent the lower edge thereof and serves as a means for anchoring a tubular screen 44 to the sleeve 40. The tubular screen 44 is of considerable length and is provided with a bottom 46 also formed of screen material.

The screen tube is formed of fine mesh screen and serves as a strainer for the air leaving the cleaner as will be hereinafter more fully set forth. The screen tube 44 has the lower end of the sleeve 40 inserted therein and by crimping or bending the screen material adjacent the groove 42 I am able to retain the screen tube upon the sleeve 40 in proper operative position.

The cover 26 is formed with a central screw threaded opening 48 having a fitting 50 inserted therein which is in communication with the supply pipe 20 which leads from the air cleaner A. The air from within the cleaner A passes through the fitting 50 and into the supply pipe 20.

The path of flow of air will hereinafter be more fully set forth in connection with the operation of my device.

Extending between a portion of the sleeve 40 and the side wall of the cover 26 is a partition member 52 (see Figure 5). The partition member 52 is positioned adjacent the opening 38 as clearly illustrated in Figures 3 and 5 of the drawings.

The space between the sleeve 40 and the side walls of the cover 26 forms a passageway 54. It may be said that the partition member 52 serves as a cut-off within the passageway 54. Positioned upon the upper end of the member 22 is a plate 56 having a number of louver openings 58 therein.

The plate 52 is formed with a central opening of sufficient diameter to permit the sleeve 40 of the cover 26 to pass therethrough. The plate 56 having the louver openings therein, serves as a bottom for the passageway 54.

Near the bottom end of the member 22 I provide a blow-out valve mechanism B. The blow-out valve B consists of a sleeve fitting 60 which is screw threaded into the member 22. The sleeve 60 is formed with a valve seat 62. A hollow valve member 64 has finger engaging lugs 66 formed thereon. The sleeve 60 is screw threaded into the member 22 and the valve member 64 is screw threaded into the sleeve 60.

In Figure 4 of the drawings, I have shown the valve member resting against the seat 62 and closing the valve opening. By rotating the valve member 64 in one direction, it causes the same to move inwardly within the member 22 and the valve is then free from its seat 62. The valve may be opened or closed as desired.

When the valve member is free from its seat 62 then the interior of the member 22 is open to atmosphere through the hollow valve member 64. The position of the entire blow-out valve B when open, is illustrated by dotted lines in Figure 4 of the drawings.

The air cleaner A may be mounted upon or within an air station by any suitable bracket or the like 68. When the cleaner A is mounted within an air station, then an extension fitting or pipe 70 may be used for connecting the cleaner proper to the blow-out valve B in such manner as will permit its operation at a point outside of the station 10.

*Practical operation*

It is well known that in air supply lines there is a certain amount of sediment which accumulates and which interferes with effective operation of controlling valves and the like and particularly with inflator units used for measuring air and that it is desirable to blow-out and thereby clean-out the supply pipe occasionally.

Condensation also forms within the pipe line 20 and it is desirable to clean-out the accumulation at regular intervals. Air from the supply tank passes through the pipe 20 into the passageway 54. It will be noted that the air passing into the passageway 54 comes therein at the pressure of the source of supply. The in-rushing air strikes against the sleeve 40.

The partition member 52 prevents air from circulating in both directions from the opening 38 but compels it to travel in one direction and as indicated by the arrow 72. The air is thus given a circular or centrifugal action. The air within the passageway 54 with the tremendous pressure back of it, passes through the louver openings 58 while in its whirling motion. After passing through the louver openings 58, it enters the member 22 of the cleaner A.

The whirling or centrifugal action upon the air compels the foreign matter or particles to be thrown outwardly and eventually fall upon the bottom of the drain trap and air cleaner A.

The clean air will pass through the fine mesh screen tube 44 and thence upwardly through the fitting 50 and into the supply pipe 20 leading from the cleaner A. The air after passing through the louver openings 58 moves in the direction indicated by the arrows 74.

From within the screen tube 44, the air passes in the direction indicated by the arrows 76 into the fitting 50 and through the pipe 20 connected thereto. The centrifugal action imparted to the air is caused by compelling the air to pass in one direction and around the sleeve 40.

The screen tube 44 is of great area which prevents it from clogging up and becoming inoperative. The heavier and foreign particles are thrown toward the outside of the member 22 and the clean air due to the large area of the screen 44, passes quickly therethrough and to the outlet portion of the pipe 20.

The plate 56 having the louver openings 58 therein may be used to accelerate the centrifugal action of the in-rushing air before it is permitted to reach the screen tube 44.

The plate 56 may be omitted if desired. Centrifugal action is imparted to the air when it enters the cleaner A even though the plate 56 is omitted. When the air station is in use the valve B is in closed position.

When it is desired to blow-out the pipe line leading to the cleaner A and the cleaner itself, it is necessary to loosen the valve member 64 and unseat it, screwing it inwardly within the sleeve 60. The air supply, at the pressure of the source, will rush through the hollow valve member 64 into atmosphere carrying with it all foreign matter which may have accumulated in the bottom of the member 22 and any accumulation of foreign matter within the pipe line 20 leading to the cleaner A.

My air cleaner and sediment trap in use is very effective and is simple in construction.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An air cleaner and sediment trap comprising a casing having an open upper end, an inverted cup shaped cover therefor, a tubular extension within said cover extending downwardly from the top portion thereof and terminating within said casing, a groove around the outside of said extension, a tubular strainer having its bottom end closed and its upper end open and crimped into the groove of said tubular extension whereby the strainer is supported relative to said cover, and openings in said cover, one of said openings communicating with the interior of said tubular extension and the other of said openings communicating with the space between said tubular extension and the periphery of the cup shaped cover.

2. An air cleaner and sediment trap comprising a casing having an open upper end, an inverted cup shaped cover therefor, a tubular extension within said cover, extending downwardly from the top portion thereof and terminating within said casing, a washer shaped louver plate surrounding said tubular extension and extending outwardly to a position between the upper end of said casing and said cover, said casing and cover being secured together with the peripheral portion of the louver plate secured between them, a tubular strainer having its bottom end closed and its upper end open and secured to the lower end of said tubular extension, and openings in said cover, one of said openings communicating with the interior of said tubular extension and the other of said openings communicating with the space between said tubular extension and the periphery of the cup shaped cover.

3. In a compressed air service station, the combination with a dust separator casing; of means for forcing compressed air through said casing; a top cover for said casing, having a downwardly extending tubular sleeve terminating within said casing, in spaced relation to the peripheral wall of the latter; a foraminous tubular screen, closed at its lower end and secured at its upper end to the lower portion of said tubular sleeve; a compressed air inlet in communication with an outer chamber in said casing, outside of said sleeve and screen; a compressed air outlet in communication with an interior chamber in said casing, within said sleeve and screen; and means for imparting centrifugal movement to dust laden compressed air in flowing from said inlet to said outlet, including an annular louver plate in the upper portion of said outer chamber, between the compressed air inlet and said sleeve and above said screen.

4. A compressed air service station as in claim 3, including a valve controlled dust vent in the lowermost portion of the peripheral wall of said casing for affording intermittent communication between the bottom of said outer chamber and the outer atmosphere; whereby, dust separated from the compressed air and deposited in the bottom of said separator casing may be instantly swept out through said vent, by the compressed air in said casing, when said vent is momentarily opened, and while compressed air is being dispensed through said outlet.

5. In a compressed air service station, the combination with a dust separator casing having a compressed air inlet and a compressed air outlet with a foraminous screen between them; of means for forcing compressed air from said inlet through said screen and outlet; means in said casing between said inlet and screen for imparting centrifugal motion to the dust laden compressed air; whereby the dust is caused to gravitate down the peripheral wall of the casing to the bottom thereof; a dust vent at the periphery and bottom of said casing wall; and a valve controlling said vent; whereby the centrifugal motion imparted to said compressed air may be utilized to instantly sweep the dust from said casing through said vent, by the compressed air in said casing, when said valve is momentarily opened, and while compressed air is being dispensed through said outlet.

6. In a compressed air service station comprising the elements of claim 5; wherein the means for supplying compressed air through said separator casing, includes a compressed air supply pipe, means coupling said pipe with said fluid inlet, a compressed air dispensing hose, and means coupling said hose with said outlet; an outer casing (10) inclosing and protecting said dust separator casing and said connecting means from tampering; a conduit extension from said vent, leading through said outer casing; and means exterior to said outer casing for opening said vent valve; whereby the dust may be discharged from said separator casing into the atmosphere exterior to said outer casing, by the compressed air in said separator casing, while compressed air is being dispensed through said hose.

Des Moines, Iowa, May 12, 1927.

JOE C. WOODFORD.